United States Patent [19]

Amundson, Jr. et al.

[11] Patent Number: 5,070,043
[45] Date of Patent: Dec. 3, 1991

[54] COLORED GLASS-CERAMICS

[75] Inventors: W. Duane Amundson, Jr., Caton; Jaroslava M. Nigrin, Corning, both of N.Y.

[73] Assignee: Corning Incorporated, Corning, N.Y.

[21] Appl. No.: 603,407

[22] Filed: Oct. 26, 1990

[51] Int. Cl.$^5$ .................. C03C 10/16; C03C 3/087
[52] U.S. Cl. ............................. 501/3; 501/71
[58] Field of Search .................. 501/3, 71, 57

[56] References Cited

U.S. PATENT DOCUMENTS

| | | | |
|---|---|---|---|
| Re. 25,312 | 1/1963 | Duncan et al. | 501/71 |
| 2,901,366 | 8/1959 | Smith et al. | 501/71 |
| 3,723,142 | 3/1973 | Kato et al. | 501/71 |
| 4,339,541 | 7/1982 | Dela Ruye | 501/71 |
| 4,461,839 | 7/1984 | Rittler | 501/71 |
| 4,467,039 | 8/1984 | Beall et al. | 501/3 |
| 4,608,348 | 8/1986 | Beall et al. | 501/3 |
| 4,786,617 | 11/1988 | Andrien et al. | 501/3 |

Primary Examiner—Mark L. Bell
Attorney, Agent, or Firm—Milton M. Peterson; Clinton S. Janes, Jr.

[57] ABSTRACT

A color package is disclosed that provides a light beige tint in potassium fluorrichterite glass-ceramic materials containing a cristobalite secondary crystal phase. The package includes $Fe_2O_3$, NiO, Se and, optionally, cobalt oxide within limited ranges.

6 Claims, 2 Drawing Sheets

COLORED GLASS-CERAMICS

FIELD OF THE INVENTION

The field is colored glass-ceramics, more particularly, compositions of potassium fluorrichterite glass-ceramics containing colorants.

BACKGROUND OF THE INVENTION

U.S. Pat. No. 4,331,719 (Danielson et al.) describes tinted, spontaneous opal glasses ranging in color from ivory to brown. The tint is imparted by incorporating up to one percent nickel oxide (NiO) into the base glass composition. The patent further discloses that these tinted opals are adapted to use as the core glass in a three-ply glass laminate.

A line of opal glass tableware, produced in accordance with the teachings of the Danielson et al. patent, is marketed by Corning Incorporated under the registered trademark CORNERSTONER ®. This ware exhibits a beige tint that is defined in copending application Ser. No. 464,372 (Amundson, Jr. et al.), that application being assigned to the assignee of the present application. The tint is there defined with reference to the standard CIE system utilizing chromaticity coordinates x and y and the tristimulus value Y. Acceptable x and y coordinates fall within a polygon ABCDEFA in the drawing of the Amundson, Jr. et al. application.

Chromaticity values are measured under standard conditions, i.e., Illuminant C, with a Hunter Colorimeter. They are a measure of light that diffusely reflects off opaque surfaces. Because the values obtained are readily reproducible, they are commonly employed to facilitate comparisons and to establish specification limits.

The CORNERSTONER ® product is produced by cutting and molding desired shapes from a laminated glass sheet. The process is described in U.S. Pat. No. 3,673,049 (Giffen et al.). It has been found particularly useful in producing dinnerware, with the exception of one item. The process does not lend itself to molding a closed-handle cup or mug. The provision of this item to complete a dinnerware set has been a continuing problem.

One solution proposed has been to mold the cup from a gob of a traditional opal glass. However, the resulting product does not have the strengthening capability inherent in the laminated sheet product. Thus, a separate processing step would be required to impart extra strength.

Accordingly, consideration has been given to utilizing a glass-ceramic material, that is, a glass capable of being essentially uniformly thermally crystallized.

Glass-ceramic materials having a predominant crystal phase of potassium fluorrichterite, but modified by the presence of at least 10% cristobalite, are disclosed in U.S. Pat. No. 4,608,348 (Beall et al.). These materials are described as exhibiting great toughness and a modulus of rupture (MOR) of at least 20,000 psi, and incurring a limited degree of sagging during crystallization. These properties make the materials particularly useful in producing molded articles, such as dinnerware.

In particular, this provides an answer to the problem of producing a closed-handle cup, or mug, for inclusion in the CORNERSET ® set. However, to be successfully used in this manner, the glazed glass-ceramic cup or mug must provide an exact color match.

PURPOSES OF THE INVENTION

A basic purpose is to provide a combination of colorants that impart a color, within predetermined limits, to the fluorrichterite glass-ceramics of Beall et al. -348.

Another purpose is to provide a molded glass-ceramic article having a beige tint matching that of the CORNERSTONER ® dinnerware line.

A further purpose is to provide a closed-handle cup or mug for inclusion in the CORNERSTONER ® dinnerware line.

SUMMARY OF THE INVENTION

In furtherance of these purposes, our invention is a beige-tinted, opaque, glass-ceramic material having potassium fluorrichterite as its predominant crystal phase, having at least 10% by volume of cristobalite as a secondary phase, having a base composition consisting essentially of, when expressed in terms of weight percent on an oxide basis,

| $SiO_2$ | 65–69 | $Na_2O$ | 1.5–3.3 |
|---|---|---|---|
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5 | including a combination of colorants selected from the following ranges, 0.065–0.16% $Fe_2O_3$
0.055–0.16% NiO
0.0015–0.0029% Se
0–0.0014% $Co_3O_4$ and, in conjunction with a glaze, exhibits x and Y color coordinates (illuminant C) and tristimulus value Y falling within the polygon ABCDEFA defined in FIG. 1 of the appended drawing.

The invention further resides in an article produced from such material. The article may have a glaze, such as either a lead glaze or a lead-free glaze, on its surface.

PRIOR ART

As might well be expected, colorants, known in the glass art, have been incorporated into precursor glass compositions which have subsequently been crystallized in situ to glass-ceramic articles. U.S. Pat. No. 4,461,839 (Rittler) and U.S. Pat. No. 4,786,617 (Andrieu et al.) are recent illustrations of that practice.

The former patent discloses the manufacture of opaque, glass-ceramic articles containing B-spodumene solid solution as the predominant crystal phase. These articles can display colors ranging from gray-to-brown-to-almond-to-beige-to-yellow-to-blue. They are prepared from precursor glass articles having base compositions essentially free from MgO, and consist essentially, in weight percent, of:

| $SiO_2$ | 63.5–69 | BaO | 0–5 |
|---|---|---|---|
| $Al_2O_3$ | 15–25 | $TiO_2$ | 2–3 |
| $Li_2O$ | 2.5–4 | $ZrO_2$ | 0.5–2.5 |
| $Na_2O$ | 0.1–0.6 | $As_2O_3$ | 0.4–0.8 |
| $K_2O$ | 0.1–0.6 | $Fe_2O_3$ | 0.05–0.1 |
| ZnO | 0–2. | | |

The desired colors are obtained through the use of a "color package" containing about 0.5–3% $TiO_2$, up to 0.15% $Fe_2O_3$, and 0.3–3% total of at least two oxides in the indicated proportion selected from the group of up to 0.3% $V_2O_5$, up to 3% $CeO_2$, up to 2% CaO, up to 1% NiO, up to 1% $WO_3$, and up to 1.5% $SnO_2$. The total $TiO_2$ content in the glass will range >2.5-6%, and that of the $Fe_2O_3$ content will range 0.05%-0.2%.

The latter patent describes the fabrication of opaque, glass-ceramic articles containing potassium fluorrichterite and/or a related fluormica as the predominant crystal phase (s). The precursor glass compositions are essentially free from $Li_2O$, and consist essentially, in weight percent of

| | | | |
|---|---|---|---|
| $SiO_2$ | 61–70 | $K_2O$ | 2.5–5.5 |
| $Al_2O_3$ | 2.75–7 | $Na_2O + K_2O$ | <6.8 |
| MgO | 11–16 | F | 2–3.25 |
| CaO | 4.75–9 | BaO | 0–3.5 |
| $Na_2O$ | 0.5–3 | $P_2O_5$ | 0–2.5 |

The text of the patent noted that it was possible to incorporate such conventional glass colorants as $Fe_2O_3$, $CeO_2$, CoO, $Cr_2O_3$, CuO, $MnO_2$, NiO, and $V_2O_5$ into the base, precursor glass composition in amounts typically less than 1% total. Nevertheless, only the use of $Fe_2O_3$ to impart a yellow tint to the glass, was expressly mentioned.

Each of the following United States patents discloses glass compositions embodying a color package composed, in part at least, of the same colorants as those used for present purposes. However, the colorants are used in different amounts, and the colors achieved are quite different.

Reissue U.S. Pat. No. 25,312 (Duncan et al.) describes a heat absorbing, soda lime glass having a neutral gray color imparted by the color package,

| | |
|---|---|
| $Fe_2O_3$ | 0.2–1 |
| NiO | 0.003–0.05 |
| CoO | 0.003–0.02 |
| Se | up to 0.2 |

U.S. Pat. No. 3,143,683 (Duncan et al.) also describes a soda lime glass having a neutral gray color, but intended for an implosion window in a color TV set. The color package is,

| | |
|---|---|
| $Fe_2O_3$ | 0.05–0.4 |
| NiO | 0.01–0.05 |
| CoO | 0.002–0.006 |
| Se | 0.002–0.02 |
| $Nd_2O_3$ | 0.3–1.2 |

U.S. Pat. No. 4,339,541 (Dela Ruye) describes a neutral gray, soda lime glass for glazing purposes that has this color package,

| | |
|---|---|
| $Fe_2O_3$ | 0.3–0.5 |
| $Cr_2O_3$ | 0.0075–0.0230 |
| Se | 0.0005–0.0019 |
| Co | 0.0040–0.0070 |
| Ni | 0.0050–0.0120 |

DESCRIPTION OF THE INVENTION

Figure 1:
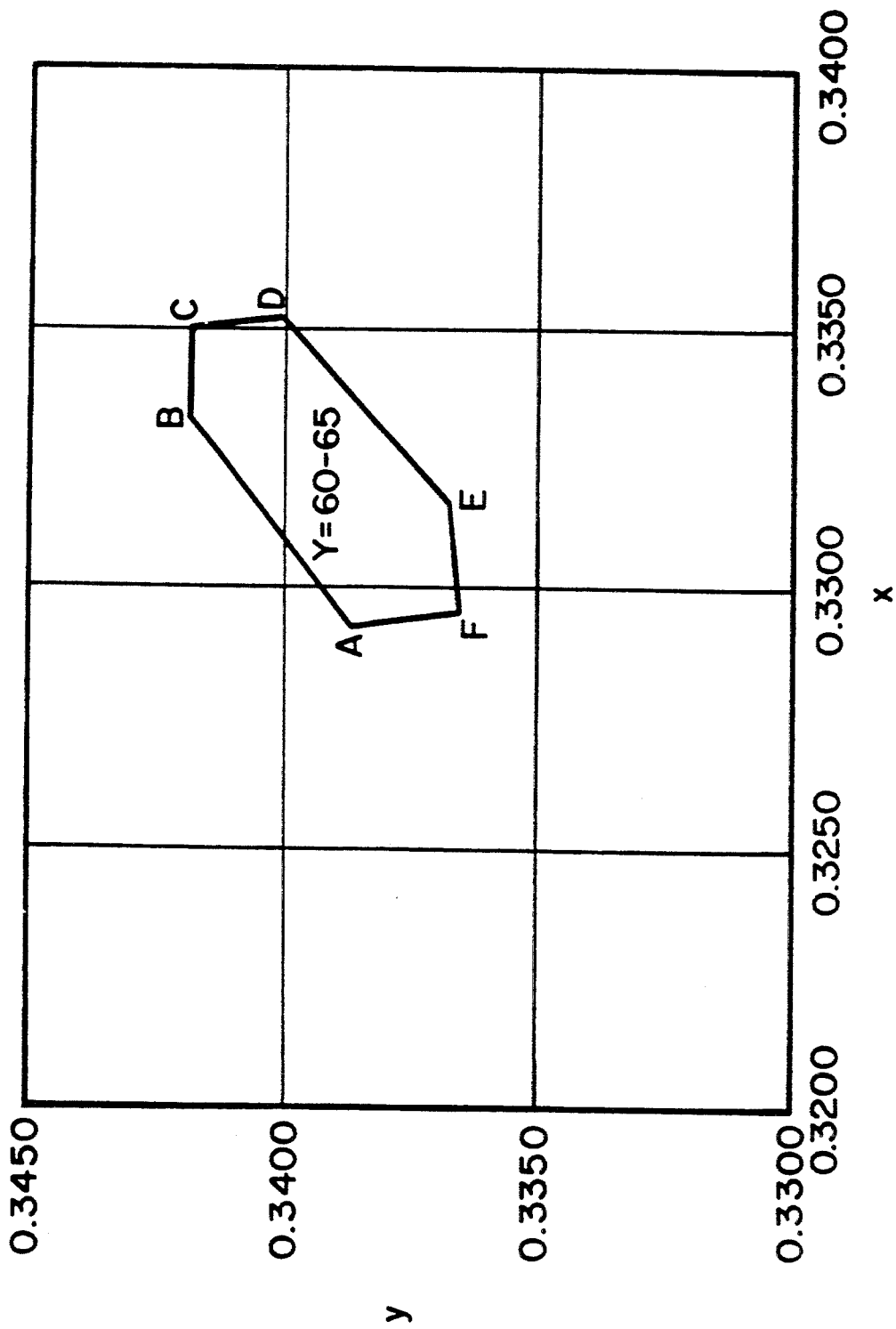
FIGS. 1 and 2, in the accompanying drawing, are graphical representations of reflectance chromaticity coordinates x and y (Illuminant C) for glass-ceramic bodies. Polygon ABCDEFA, in FIG. 1, defines the coordinate limits for the article of the invention. Overlapping polygons ABCDEFA and GHIJKLG, in FIG. 2, define coordinate limits for two embodiments of the present invention. x coordinates are plotted on the horizontal axis, and y coordinates on the vertical axis. Tristimulus values Y are stated since they represent a third dimension.

The present invention is characterized by a color package adapted to provide a specified tint in the glass-ceramic materials described in Beall et al. - 348. The materials there described have a predominant crystal phase of potassium fluorrichterite and contain at least 10% by volume cristobalite as a secondary phase. As calculated on an oxide basis, in percent by weight, the Beall et al. glass-ceramics are composed essentially of,

| | | | |
|---|---|---|---|
| $SiO_2$ | 65–69 | $Na_2O$ | 1.5–3.3 |
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5 | for further information, see the Beall et al. patent, which is incorporated herein in its entirety by reference.

The present invention is based on our discovery of a color package that can be incorporated in the potassium fluorrichterite glass-ceramics of the Beall et al. patent to provide a color match for the light beige tint characteristic of the CORNERSTONE ® tableware. The color to be matched is defined in terms of x and y coordinates and tristimulus value Y in the Amundson, Jr. et al. application noted earlier. It is illustrated in the drawing of that application, as well as in FIG. 1 of the present application.

The chromaticity coordinate ranges, that characterize the article of the present invention, are dependent on the effect of glazing applied to the ultimate ware. Some glazes tend to impart a color to the article. This must, effectively, be combined with any color added to an article body when a color match is to be made. In contrast, other glazes tend to impart little, or no, color. Hence, they have little influence on the ultimate color of an article.

The overall color package then consists of
0.065–0.16% $Fe_2O_3$
0.055–0.16% NiO
0.0015–0.0029% Se
0–0.0014 $Co_3O_4$ Based on our extensive, color package studies in numerous melts, we have calculated the changes that occur in chromaticity coordinate values as the contents of the various colorants in the package are changed. The calculated changes in coordinate values, for a given increase (delta) in weight percent (wt%) for each colorant, are shown in TABLE 1. Increases in coordinate values are shown by a plus sign; decrease by a minus sign.

TABLE 1

| Delta (wt. %) | x | y | Y |
|---|---|---|---|
| 0.10% NiO | +.0048 | +.0091 | −3.4 |
| 0.10% $Fe_2O_3$ | +.0086 | 0 | −15.5 |
| 0.0010% Se | +.0064 | +.0023 | −4.6 |
| 0.0010% $Co_3O_4$ | −.0048 | −.0035 | −2.1 |

When used in the color package of the present invention, the colorants NiO, Fe$_2$O$_3$ and Se regulate the hue (as measured by the chromaticity coordinates), whereas cobalt oxide controls brightness (as measured by the tristimulus value Y). Thus, increasing either the NiO or the Se content in the package tends to increase both the x and y values. Increasing the Fe$_2$O$_3$ content also tends to increase the x coordinate, but has little or no effect on the y coordinate. An increase cobalt oxide depresses the brightness. However, it also tends to decrease both the x and the y coordinate values. Hence, these effects must be taken into consideration if the oxide is used.

Figure 2:
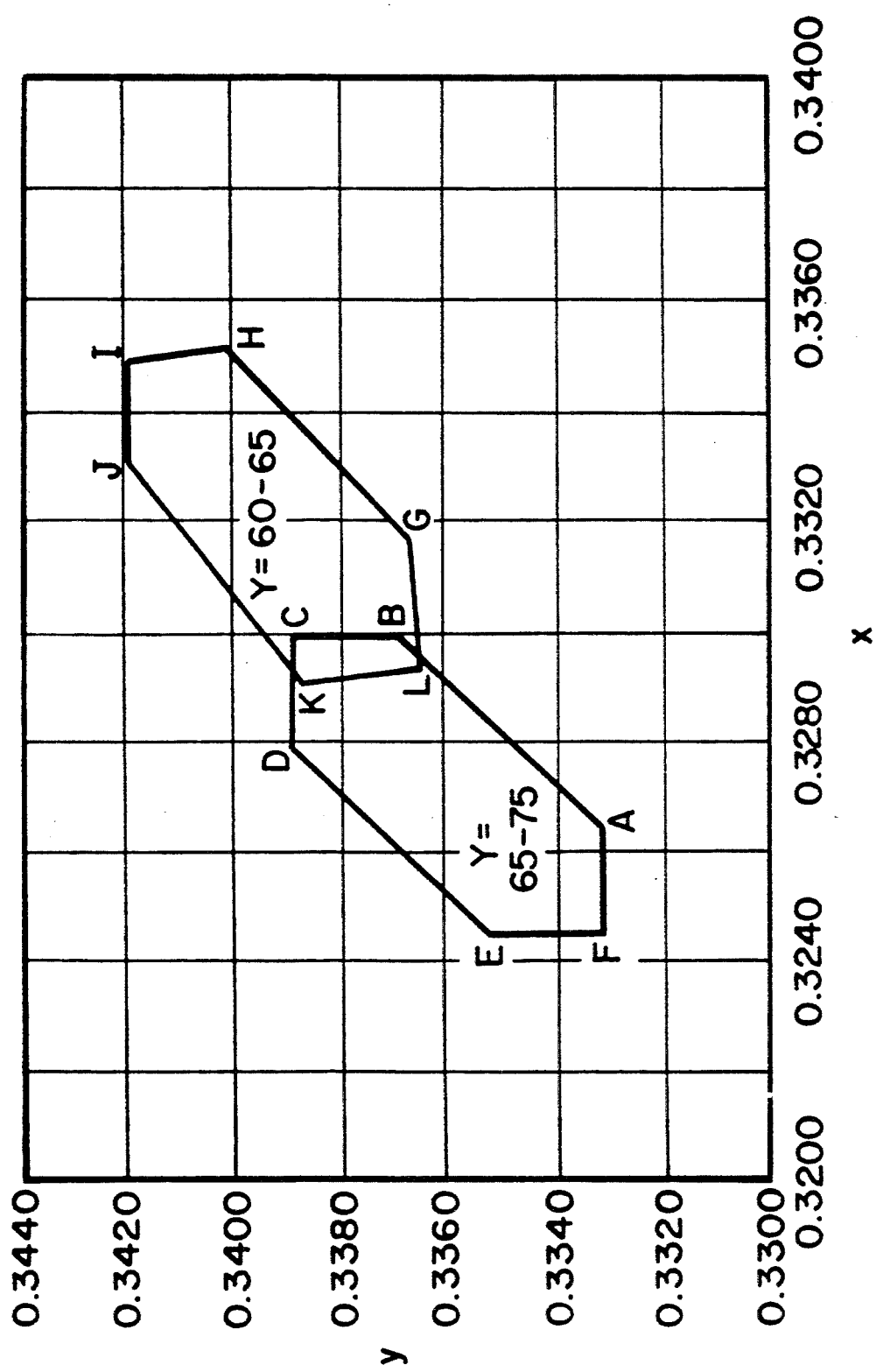

Polygon ABCDEFA, in FIG. 2 of the drawing, defines the targeted chromaticity coordinate values desired in a colored body, in accordance with the invention, that will have a specific lead-containing glaze applied to its surface. The glaze is one available from Ferro Corporation under the designation 839 CTB. The numerical ranges for color coordinates x, y, and Y, in the polygon ABCDEFA of FIG. 2, are, x=0.3245 to 0.3300
y=0.3333 to 0.3390
Y=65-75.

To provide unglazed, potassium fluorricherite, glass-ceramic articles having color coordinate values within these ranges, we employ the following combination of colorants within the following ranges by weight percent, 0.065-0.12% Fe$_2$O$_3$
0.055-0.10% NiO
0.055-0.10%
0.0015-0.0020% Se
0-0.0014% Co$_3$O$_4$ Overlapping polygon GHIJKLG defines the targeted chromaticity coordinate values desired in a colored body, in accordance with the invention, that will have a lead-free glaze applied to its surface. The glaze is one available from Ferro Corporation under the designation 1189-N. The numerical ranges for color coordinates x, y and Y are x=0.3292 to 0.3352
y=0.3367 to 0.3420
Y=60-65

To provide unglazed, glass-ceramic articles having color coordinate values within these ranges, we employ the same combination of colorants within the following ranges by weight percent, 0.08-0.16% Fe$_2$O$_3$
0.09-0.16% NiO
0.0018-0.0029% Se
0.0008-0.0014% Co$_3$O$_4$

SPECIFIC EMBODIMENTS

While more broadly applicable, the invention was developed in conjunction with a specific glass-ceramic base material. This base material has the following approximate composition, as calculated in parts by weight on an oxide basis, the fluorine being stated separately,

| SiO | 66.2 | Na$_2$O | 3.1 |
|---|---|---|---|
| Al$_2$O$_3$ | 1.7 | K$_2$O | 4.7 |
| MgO | 14.1 | BaO | 0.2 |
| CaO | 4.6 | P$_2$O$_5$ | 1.2 |
| Li$_2$O | 0.8 | F | 3.3 |
| | | Sb$_2$O$_3$ | 0.07 |

Inasmuch as the sum of those components closely approximates 100, for all practical purposes, the values can be deemed to represent weight percent.

A series of different color packages was formulated. Each was incorporated in a glass batch having the indicated base composition. Each of the exemplary batches was mixed and ball milled to promote homogeneity. The charge was then placed in a platinum crucible and covered for melting.

Each batch was melted by holding for three hours in a furnace operating at a temperature of 1450° C. The melt was removed, stirred for ten minutes and returned to the melting furnace for 30 minutes. The melt was then poured into molds, cooled and annealed at 600° C. The annealed samples were then crammed in an electric or a gas fired laboratory furnace. Typical schedules were,

| Electric | Gas |
|---|---|
| 2 hours to 600° C. | 2 hours to 800° C. |
| 4 hours 600° C. to 1000° C. | 2 hours 800° C. to 1000° C. |
| 2 hours hold at 1000° C. | 2 hours hold at 1000° C. |
| Cool at furnace rate | Cool at furnace rate |

Samples were then ground and polished for color measurements. The observed data for the samples are shown in TABLE 2 below. The x and y values are the chromaticity coordinates observed on a Hunter Colorimeter, and the Y data are the tristimulus values.

TABLE 2

| COLOR MEASUREMENTS | | | |
|---|---|---|---|
| | x | y | Y |
| 1 | .3262 | .3335 | 78.4 |
| 2 | .3291 | .3379 | 76.7 |
| 3 | .3296 | .3400 | 76.0 |
| 4 | .3246 | .3382 | 82.0 |
| 5 | .3290 | .3381 | 78.5 |
| 6 | .3309 | .3381 | 71.1 |
| 7 | .3246 | .3358 | 80.5 |
| 8 | .3295 | .3378 | 77.3 |
| 9 | .3323 | .3386 | 75.1 |
| 10 | .3261 | .3346 | 65.8 |

A sample of each glass was chemically analyzer for the four colorants added to the batch initially. The values obtained are shown in TABLE 3.

TABLE 3

| CHEMICAL ANALYSES IN WT % | | | | |
|---|---|---|---|---|
| SAMPLE | NiO | Fe$_2$O$_3$ | Se | Co$_3$O$_4$ |
| 1. | 0.055 | 0.092 | 0.0020 | 0 |
| 2. | 0.094 | 0.095 | 0.0018 | 0 |
| 3. | 0.126 | 0.094 | 0.0019 | 0 |
| 4. | 0.091 | 0.056 | 0.0021 | 0 |
| 5. | 0.088 | 0.092 | 0.0019 | 0 |
| 6. | 0.088 | 0.129 | 0.0019 | 0 |
| 7. | 0.089 | 0.089 | 0.0017 | 0 |
| 8. | 0.090 | 0.090 | 0.0021 | 0 |
| 9. | 0.090 | 0.090 | 0.0029 | 0 |
| 10. | 0.090 | 0.126 | 0.0017 | 0.0010 |

It will be appreciated that the examples shown represent small, exploratory, experimental melts. While they clearly demonstrate the phenomenon involved, they do not, for the most part, provide the specific coordinate values desired. For example, additional colorants are necessary in each composition, other than sample 10, to lower the tristimulus value Y. These samples did provide data which was used to determine the coordinate value changes shown in TABLE 1 above. These coordinate value vs. composition changes were then employed to formulate compositions for larger scale melts.

By way of further illustrating the invention then, four such compositions were formulated. The formulations used the base glass composition set forth earlier. The color packages are shown in TABLE 4, below,

TABLE 4

|  | NiO | Fe$_2$O$_3$ | Se | Co$_3$O$_4$ |
|---|---|---|---|---|
| 11. | 0.061 | 0.061 | 0.0011 | 0.0007 |
| 12. | 0.087 | 0.069 | 0.0016 | 0.0007 |
| 13. | 0.093 | 0.083 | 0.0017 | 0.0012 |
| 14. | 0.140 | 0.100 | 0.0018 | 0.0011 |

Examples 11-13 were designed to provide a body having the lead-containing glaze 839 CTB applied to its surface. Example 14 was designed to provide a body having the lead-free glaze 1189 - N applied to its surface. It will be noted that Example 11 is slightly outside the ranges adapted to provide the desired beige tint in a glazed body.

We claim:

1. An opaque, beige-tinted, glass-ceramic material that has a predominant crystal phase of potassium fluorrichterite and a secondary phase of cristobalite amounting to at least 10% by volume, that has an overall composition including a base glass consisting essentially of, in weight percent as calculated from the batch on an oxide basis,

| SiO$_2$ | 65-69 | Na$_2$O | 1.5-3.3 |
|---|---|---|---|
| Al$_2$O$_3$ | 0.75-3.5 | K$_2$O | 4.2-6.0 |
| MgO | 13.5-17.5 | BaO | 0-2.5 |
| CaO | 3-4.8 | P$_2$O$_5$ | 0-2.5 |
| Li$_2$O | 0.5-2.0 | F | 3.3-5.5 | includes a combination of colorants selected from the following ranges, 0.065-0.16% Fe$_2$O$_3$
0.055-0.16% NiO
0.0015-0.0029% Se
0-0.0014% Co$_3$O$_4$ and, in conjunction with a glaze, exhibits x and y color coordinates (Illuminant C) falling within the polygon ABCDEFA defined in FIG. 1 of the appended drawing.

2. An opaque, glass-ceramic material in accordance with claim 1 wherein the combination of colorants is selected from the ranges, 0.065-0.12% Fe$_2$O$_3$
0.055-0.10% NiO
0.0015-0.0020% Se
0-0.0014% Co$_3$O$_4$ 3. An opaque, glass-ceramic material in accordance with claim 1 wherein the combination of colorants is selected from the ranges, 0.08-0.16% Fe$_2$O$_3$
0.09-0.16% NiO
0.0017-0.0029% Se
0.0008-0.0014% Co$_3$O$_4$, 4. An opaque, glass-ceramic article that has a predominant crystal phase of potassium fluorrichterite and a secondary phase of cristobalite amounting to at least 10% by volume, that has a beige tint defined by x and y color coordinates (Illuminant C) falling within the polygon ABCDEFA defined in FIG. 1 of the appended drawing, that has a base glass composition consisting essentially of, in weight percent as calculated from the batch on an oxide basis,

| SiO$_2$ | 65-69 | Na$_2$O | 1.5-3.3 |
|---|---|---|---|
| Al$_2$O$_3$ | 0.75-3.5 | K$_2$O | 4.2-6.0 |
| MgO | 13.5-17.5 | BaO | 0-2.5 |
| CaO | 3-4.8 | P$_2$O$_5$ | 0-2.5 |
| Li$_2$O | 0.5-2.0 | F | 3.3-5.5 | and includes a combination of colorants selected from the following ranges, 0.065-0.16% Fe$_2$O$_3$
0.055-0.16% NiO
0.0015-0.0029% Se
0-0.0014% Co$_3$O$_4$.

5. An opaque, glass-ceramic article in accordance with claim 4 wherein the combination of colorants is selected from the range, 0.065-0.12% fe$_2$O$_3$
0.055-0.10% NiO
0.0015-0.0020% se
0-0.0014% Co$_3$O$_4$.

6. An opaque, glass-ceramic article in accordance with claim 4 wherein the combination of colorants is selected from the ranges, 0.08-0.16% fe$_2$O$_3$
0.09-0.16% NiO
0.0017-0.0029% Se
0.0008-0.0014% Co$_3$O$_4$.

* * * * *